US012640380B2

(12) United States Patent
Schaich

(10) Patent No.: US 12,640,380 B2
(45) Date of Patent: May 26, 2026

(54) PRESSURE VESSEL

(71) Applicant: Robert Bosch GmbH, Stuttgart (DE)

(72) Inventor: Udo Schaich, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 274 days.

(21) Appl. No.: 18/580,721

(22) PCT Filed: Jul. 5, 2022

(86) PCT No.: PCT/EP2022/068524

§ 371 (c)(1),
(2) Date: Jan. 19, 2024

(87) PCT Pub. No.: WO2023/006352

PCT Pub. Date: Feb. 2, 2023

(65) Prior Publication Data

US 2024/0274845 A1     Aug. 15, 2024

(30) Foreign Application Priority Data

Jul. 29, 2021     (DE) ..................... 10 2021 208 221.1

(51) Int. Cl.
H01M 8/04082     (2016.01)
B60K 1/00     (2006.01)
          (Continued)

(52) U.S. Cl.
CPC ......... H01M 8/04201 (2013.01); B60L 50/72 (2019.02); F17C 1/00 (2013.01);
          (Continued)

(58) Field of Classification Search
CPC ......... H01M 8/04201; H01M 2250/20; B60L 50/72; F17C 1/00; F17C 2205/037;
          (Continued)

(56) References Cited

U.S. PATENT DOCUMENTS

| 1,936,868 A | 11/1933 | Whitney |
| 3,494,641 A | 2/1970 | Caregnato |
| | (Continued) | |

FOREIGN PATENT DOCUMENTS

| DE | 1247091 B | 8/1967 |
| DE | 102013009591 A1 | 12/2014 |
| | (Continued) | |

OTHER PUBLICATIONS

Translation of International Search Report for Application No. PCT/EP2022/068524 dated Oct. 10, 2022 (3 pages).

*Primary Examiner* — Rami Khatib
(74) *Attorney, Agent, or Firm* — Michael Best & Friedrich LLP

(57) ABSTRACT

Pressure vessel (52) for storing a fluid in an interior (58), having a vessel opening (55) for conducting the fluid out of the interior of the pressure vessel and a connecting member (62) for fixing the connecting member to the pressure vessel in a fluid-tight manner, the connecting member comprising: a connecting element (63) having an opening (65) for conducting the fluid through the vessel opening in the pressure vessel and through the opening in the connecting element; a mechanism (79) for form-fittingly and detachably fixing the connecting element to the pressure vessel such that the connecting element rests on the pressure vessel with a compressive force, wherein the mechanism comprises a first tensioning lever (80) and a second tensioning lever (81), which are connected pivotably relative to one another to a connecting joint such that, when the first tensioning lever and second tensioning lever are in a fixing position relative to one another, a compressive force is applied with the mechanism to the connecting element, and the connecting element bears against the pressure vessel with the compressive force.

15 Claims, 5 Drawing Sheets

(51) Int. Cl.

| | |
|---|---|
| *B60K 5/00* | (2006.01) |
| *B60L 50/72* | (2019.01) |
| *F17C 1/00* | (2006.01) |

(52) U.S. Cl.
CPC .................. *B60K 1/00* (2013.01); *B60K 5/00* (2013.01); *F17C 2205/037* (2013.01); *F17C 2221/012* (2013.01); *F17C 2221/033* (2013.01); *F17C 2265/066* (2013.01); *F17C 2270/0178* (2013.01); *F17C 2270/0184* (2013.01); *H01M 2250/20* (2013.01)

(58) Field of Classification Search
CPC .......... F17C 2221/012; F17C 2221/033; F17C 2265/066; F17C 2270/0178; F17C 2270/0184; F17C 13/04; B60K 1/00; B60K 5/00; F16L 37/20
See application file for complete search history.

(56) References Cited

U.S. PATENT DOCUMENTS

| | | | |
|---|---|---|---|
| 4,157,146 A | 6/1979 | Svenson | |
| 4,936,483 A | 6/1990 | Ballu | |
| 2018/0208052 A1 | 7/2018 | Heidenreich et al. | |
| 2024/0011411 A1* | 1/2024 | Askebjer ................. F01D 25/22 | |
| 2024/0180381 A1* | 6/2024 | Dang ................... A47L 7/0004 | |

FOREIGN PATENT DOCUMENTS

| | | | |
|---|---|---|---|
| DE | 102020103679 A1 | 1/2021 |
| EP | 1072838 A1 | 1/2001 |
| EP | 1222888 A2 | 7/2002 |
| EP | 2341267 A1 | 7/2011 |
| GB | 686999 A | 2/1953 |
| GB | 689358 A | 3/1953 |
| GB | 889133 A | 2/1962 |
| KR | 20180118289 A | 10/2018 |

* cited by examiner

PRESSURE VESSEL

BACKGROUND

The present invention relates to a pressure vessel, a fuel cell system and a motor vehicle.

Fuel cell units as galvanic cells convert continuously supplied fuel and oxidizing agent into electrical energy by means of redox reactions at an anode and cathode. Fuel cells are used in a wide variety of stationary and mobile applications, e.g., in homes without connection to a power grid or in motor vehicles, rail transport, aviation, space travel, and marine applications. A large number of fuel cells are stacked in the fuel cell unit to form a fuel cell stack. The fuel cell stack has integrated channels for the passage of fuel, channels for the passage of oxidizing agent and channels for the passage of coolant. The fuel is stored in a compressed gas reservoir. Several compressed gas reservoirs are often combined as pressure vessels to form a pressure vessel system.

A vessel opening in the pressure vessel is connected to a compressed gas line in a fluid-conducting and sealed manner using a connecting member. The connecting member comprises a connecting element and a mechanism with an internal and external thread. For this purpose, the internal thread is formed on the connecting element and the external thread is formed on a connecting piece of the pressure vessel. The internal thread of the connection element is screwed into the external thread of the connecting piece to secure the connection element to the pressure vessel. A mechanical aid, in particular an open-end wrench, is therefore disadvantageously required for screwing and unscrewing. However, such mechanical aids require sufficient installation space and clearance on the connecting element. However, there is often not enough installation and clearance space available on motor vehicles, making the installation and removal of the connecting member time-consuming and complicated.

SUMMARY

Pressure vessel according to the invention for storing a fluid in an interior delimited by the pressure vessel, having a vessel opening for conducting the fluid out of the interior of the pressure vessel and a connecting member for fixing the connecting member to the pressure vessel in a fluid-tight manner, the connecting member comprising a connecting element having an opening for conducting the fluid through the vessel opening of the pressure vessel and through the opening of the connecting element, a mechanism for form-fittingly and detachably fixing the connecting element to the pressure vessel, so that the connecting element bears against the pressure vessel with a compressive force, the mechanism comprising a first tensioning lever and a second tensioning lever, which are pivotably connected to one another by a connecting joint, so that, in a fixing position of the first and second tensioning levers relative to one another, a compressive force is applied to the connecting element by the mechanism and the connecting element bears against the pressure vessel with the compressive force.

In a supplementary embodiment, in the fixing position of the first and second tensioning levers relative to each other, the connecting element is form-fittingly fixed between the pressure vessel and the mechanism due to a kinematic clamping effect of the first and second tensioning levers. Due to the kinematic clamping effect of the fixing position, i.e., the position of a connecting pivot axis in a different half-space than in the lift-off position, form-fitting locking can be achieved by means of the mechanism.

In an additional embodiment, in a lift-off position of the first and second tensioning levers relative to each other, no compressive force is applied to the connecting element by the mechanism due to a pretension of the first and second tensioning levers.

In a further variant, in the lift-off position of the first and second tensioning levers relative to each other, a movement of the connecting element away from the pressure vessel can be executed without a kinematic clamping effect of the first and second tensioning levers against this movement.

In particular, the first tensioning lever is pivotably connected to the connecting element with a first fixing joint, so that a compressive force can preferably be applied to the connecting element with the first fixing joint in the fixing position.

Conveniently, the second tensioning lever is pivotably connected to the pressure vessel with a second fixing joint, so that preferably a compressive force can be applied to the pressure vessel in the fixing position with the second fixing joint.

In a supplementary variant, the first tensioning lever and the second tensioning lever can be pivoted relative to each other about a connecting pivot axis by means of the connecting joint.

In a supplementary embodiment, the first tensioning lever can be pivoted by means of the first fixing joint about a first fixing pivot axis towards the connecting element and the second tensioning lever can be pivoted by means of the second fixing joint about a second fixing pivot axis towards the pressure vessel.

In a further embodiment, the connecting pivot axis, the first fixing pivot axis and the second fixing pivot axis are aligned essentially parallel. Essentially parallel alignment means preferably that the connecting pivot axis, the first fixing pivot axis and the second fixing pivot axis are aligned parallel to each other with a deviation of less than 30°, 20°, 10° or 5°.

In an additional embodiment, a fictitious dividing plane divides the space at the pressure vessel into a first half-space and a second half-space and the fictitious dividing plane is aligned substantially parallel to the first and second fixing pivot axes and the first and second fixing pivot axes intersect the fictitious dividing plane or the first and second fixing pivot axes lie completely in the fictitious dividing plane. Aligned essentially parallel means preferably that the fictitious dividing plane is aligned parallel to the first and second fixing pivot axis with a deviation of less than 30°, 20°, 10° or 5°.

In a supplementary embodiment, in the fixing position the connecting pivot axis is arranged in the first half-space, in particular at a distance of at least 1 cm, 2 cm, 3 cm, 5 cm or 10 cm from the fictitious dividing plane.

In a further variant, the connecting pivot axis is arranged in the second half-space in the lift-off position, in particular at a distance of at least 1 cm, 2 cm, 3 cm, 5 cm or 10 cm from the fictitious dividing plane.

Preferably, the compressive force applied to the connecting element by the mechanism is applied by pretensioning the first tensioning lever with a compressive force and preferably a bending moment and pretensioning the second tensioning lever with a tensile force and preferably a bending moment.

Fuel cell system according to the invention, in particular for a motor vehicle, comprising a fuel cell unit, at least one pressure vessel, wherein the at least one pressure vessel is designed as a pressure vessel described in this property right application.

Motor vehicle according to the invention, comprising a drive motor as an electric motor and/or internal combustion engine, at least one pressure vessel filled with a gaseous fuel, wherein the at least pressure vessel is designed as a pressure vessel described in this property right application and/or the motor vehicle comprises a fuel cell system described in this property right application.

In a further embodiment, the fuel cell system comprises a gas conveying device for conveying a gaseous oxidizing agent to the fuel cells.

Drive system according to the invention, in particular for a motor vehicle, comprising a drive motor and at least one pressure vessel, wherein the pressure vessel is designed as a pressure vessel described in this property right application.

In an additional embodiment, the drive motor of the drive system is an electric motor which can be operated with electrical energy from a fuel cell system and the drive system comprises the fuel cell system and/or the drive motor is an internal combustion engine which can be operated with the fuel from the at least one pressure vessel.

In a further variant, a guide surface is formed on the connecting element and a counter-guide surface is formed on the pressure vessel, and the guide surface bears against the counter-guide surface, so that movement parallel to the connecting pivot axis, the first fixing pivot axis and the second fixing pivot axis between the connecting element and the pressure vessel is blocked due to the form-fitting connection between the guide surface of the connecting element and the counter-guide surface of the pressure vessel.

In a further variant, a guide surface is formed on the connection element and a counter-guide surface is formed on the pressure vessel and the guide surface bears against the counter-guide surface, so that in the form-fitting connection between the guide surface of the connection element and the counter-guide surface of the pressure vessel and due to the geometry of the guide surface and the counter-guide surface a movement perpendicular to the connecting pivot axis, the first fixation pivot axis and the second fixation pivot axis and/or parallel to the central longitudinal axis of the pressure vessel between the connection element and the pressure vessel can be carried out. The connecting element can thus be moved away from the pressure vessel in the direction of the centric longitudinal axis in the lift-off position of the mechanism.

In a supplementary embodiment, the vessel opening of the pressure vessel is aligned with the opening of the connecting element when the connecting member is fixed to the pressure vessel. The fluid, in particular the fuel, can thus simply be fed first through the vessel opening and then through the opening of the connection element.

In a supplementary embodiment, in the fixing position the connecting joint is arranged in the first half-space, in particular at a distance of at least 1 cm, 2 cm, 3 cm, 5 cm or 10 cm from the fictitious dividing plane.

In a further variant, the connecting joint is arranged in the second half-space in the lift-off position, in particular at a distance of at least 1 cm, 2 cm, 3 cm, 5 cm or 10 cm from the fictitious dividing plane.

In an additional embodiment, the mechanism with the first and second tensioning levers has a form-fitting clamping effect in the fixing position, so that a force applied to the connecting element to move the connecting element away from the pressure vessel, in particular in a direction parallel to the centric longitudinal axis, is blocked by the first and second tensioning levers and, due to the kinematics, this force applied to the connecting element does not cause sufficient torque to move the first tensioning lever from the fixing position via the unstable intermediate position to the lift-off position.

In a further embodiment, in an unstable intermediate position of the first and second tensioning lever, the fictitious dividing plane is aligned essentially parallel to the connecting pivot axis, in particular with a deviation of less than 30°, 20°, 10° or 5°, and the connecting pivot axis intersects the fictitious dividing plane. Preferably, in the unstable intermediate position, the connecting pivot axis lies completely in the fictitious dividing plane.

In a supplementary embodiment, the distance between the connecting pivot axis and the second fixing pivot axis is greater in the unstable intermediate position, in particular by 1%, 2%, 3%, 5%, 7% or 10%, than in the fixing position. Due to the greater distance in the unstable intermediate position than in the fixing position between the connecting pivot axis and the second fixing pivot axis, the compressive forces in the first tensioning lever and the tensile forces in the second tensioning lever are greater in the unstable intermediate position than in the fixing position, so that a force must be applied to the first tensioning lever to move or pivot the first and second tensioning levers from the stable fixing position to the unstable intermediate position. Unintentional movement or pivoting of the mechanism from the fixing position to the lift-off position is therefore impossible because the unstable intermediate position must be overcome to move from the fixing position to the lift-off position. In the unstable intermediate position, the maximum distance between the connecting pivot axis and the second fixing pivot axis and the maximum pretension of the first and second tensioning lever thus occurs on the mechanism.

In a supplementary embodiment, the compressive force applied by the mechanism to the connecting element is applied in the fixing position by pretensioning the first tensioning lever with a tensile force and preferably a bending moment and/or pretensioning the second tensioning lever with a compressive force and preferably a bending moment.

In a further embodiment, the rotational angle position of the first and second tensioning levers differs from one another by at least 3°, 5°, 10° or 20° between the unstable intermediate position and the fixing position.

In a further variant, the mechanism comprises a stop for limiting the swivel movement of the first and second tensioning levers up to the fixing position.

In a supplementary embodiment, the connecting element is annular and/or cylindrical-jacketed and/or tubular and/or disc-shaped with an opening.

In an additional embodiment, the first tensioning lever and/or second tensioning lever and/or connecting bolt and/or first fixing bolt and/or second fixing bolt is made of metal, in particular steel.

In a further variant, the mechanism comprises two first tensioning levers, two second tensioning levers, two connecting joints, two first fixing joints and two second fixing joints. A first and second tensioning lever thus form a sub-mechanism.

Preferably, the fuel cell system with several pressure vessels comprises a pressure vessel system.

In a supplementary embodiment, several pressure vessels in a pressure vessel system are connected to one another with a rail in a fluid-conducting manner for the fluid, in particular the fuel, and the rail is connected to the pressure vessels with the connecting member, in particular one pressure vessel each is connected to the rail in the pressure vessel system with a connecting member.

In an additional embodiment, an operating valve and/or a pressure relief valve and/or a TPRD and/or a temperature sensor is installed or integrated in the connecting member, in particular the connecting element.

In a further variant, the movement of the first and second tensioning levers between the fixing position and the lift-off position and preferably vice versa, in particular exclusively, is a pivoting movement.

Preferably, the operating valve can be actively closed and opened, in particular by means of an electromagnet, and preferably as a function of the operating state of the fuel cell unit. During operation of the fuel cell unit, the service valve is therefore open and when the fuel cell unit is switched off, the service valve is closed.

Preferably, the fuel is hydrogen, hydrogen-rich gas, reformate gas, or natural gas.

Advantageously, the fuel cells are substantially planar and/or disc-shaped.

In a supplementary variant, the oxidizer is air with oxygen or pure oxygen.

Preferably, the fuel cell unit is a PEM fuel cell unit with PEM fuel cells.

BRIEF DESCRIPTION OF THE DRAWINGS

Exemplary embodiments of the invention are explained in greater detail below with reference to the accompanying drawings. The following are shown.

DETAILED DESCRIPTION

Figure 1:
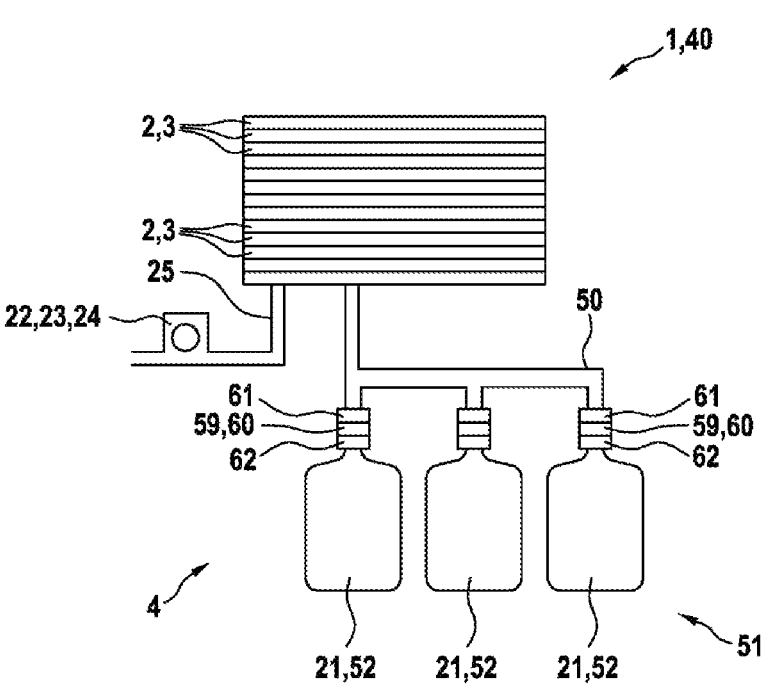
FIG. 1 a highly simplified illustration of a fuel cell system with a fuel cell unit, FIG. 2 a cross-section of a pressure vessel system with three pressure vessels, FIG. 3 a longitudinal section of the pressure vessel according to FIG. 2 as a compressed gas reservoir, FIG. 4 a mechanism of a connecting member for the pressure vessel in a lift-off position, FIG. 5 the mechanism shown in FIG. 8 of the connecting member for the pressure vessel in a fixing position, FIG. 6 the pressure vessel with the connecting member in the fixing position of the mechanism and FIG. 7 a side view of a motor vehicle.

FIG. 1 shows a highly simplified fuel cell system 4. The fuel cell system 4 comprises a fuel cell unit 1 and several compressed gas reservoirs 21 as pressure vessels 52, which form a pressure vessel system 51. In the fuel cell unit 1, a large number of fuel cells 2, namely PEM fuel cells 3, are stacked to form a fuel cell stack 40 as a fuel cell stack 40. For example, 400 fuel cells 2 are stacked in the fuel cell stack 40. In addition to the fuel cell stack 40, the fuel cell unit 1 comprises a housing (not shown) and a connection plate (not shown). The housing and the connection plate enclose the fuel cell stack 40. In the fuel cell stack 40, channels are formed for the passage of hydrogen fuel, channels for the passage of air oxidant and channels for the passage of a coolant. The process fluids fuel, oxidizing agent and coolant are fed into the channels of the fuel cell stack 40 through openings in the connection plate, which is not shown. The coolant, in particular a cooling liquid, is used to temper, in particular cool, the fuel cell stack 40 to an intended operating temperature. The oxidizing agent air is introduced into the fuel cell unit 1 through a supply line 25 for oxidizing agent by a gas conveying device 22, for example a blower 23 or a compressor 24. In the pressure vessel system 51, three pressure vessels 52 filled with hydrogen are arranged and the hydrogen fuel in the pressure vessels 52 is fed into the fuel cell unit 1 through a compressed gas line 50, i.e., into the channels for fuel in the fuel cell stack 40.

Figure 7:
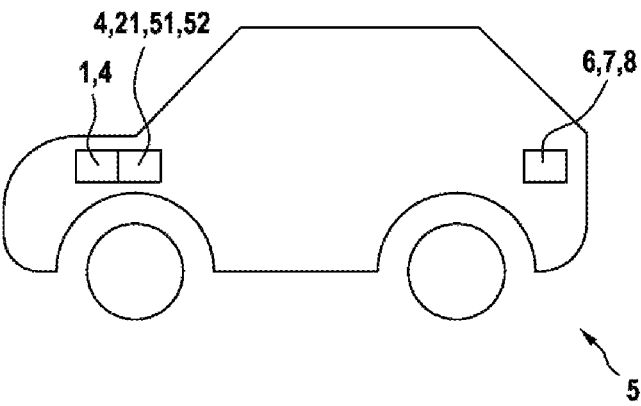

In the fuel cell system 4, i.e., in the fuel cell unit 1, the electrochemical energy of the fuel is converted into electrical energy. This electrical energy is used on a motor vehicle 5 (FIG. 7) to drive an electric motor 6. The electric motor 6, which is driven by electrical energy from the fuel cell unit 1, is used for driving and traction of the motor vehicle 5. Deviating from this, the fuel in the pressure vessels 52 can also be used to operate an internal combustion engine 7 of the motor vehicle 5.

Figure 2:
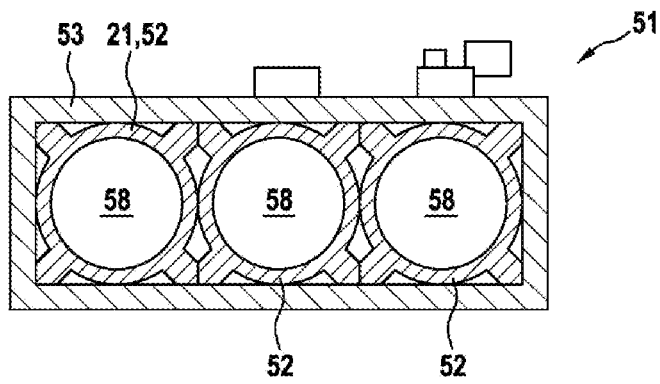
Figure 3:
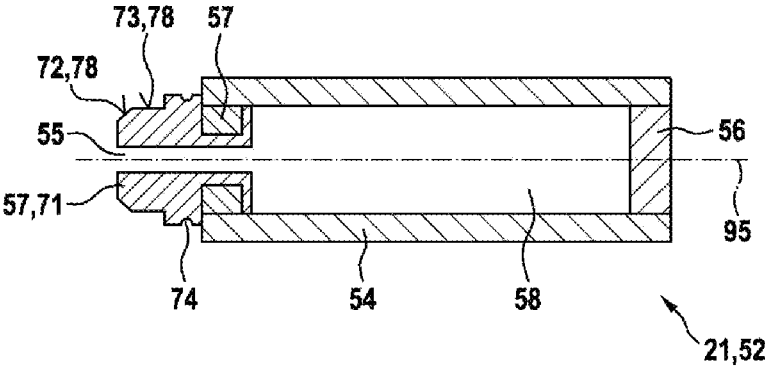

FIG. 2 shows the pressure vessel system 51 with three pressure vessels 52 as compressed gas reservoir 21. The three pressure vessels 52 are essentially cylindrical-jacketed in cross-section and are arranged within a housing 53 of the pressure vessel system 1. The housing 53 is essentially rectangular in shape. FIG. 3 shows a longitudinal section of the pressure vessel 52. The pressure vessel 52 is symmetrical with respect to a centric axis of symmetry 95 and a centric longitudinal axis 95. The pressure vessel 52 delimits an interior 58 which is filled with fuel in the form of hydrogen at a pressure of approximately 15 to 800 bar. The interior 58 is bounded by a cylindrical-jacketed vessel side wall 54 and a rear wall 56. In addition, the interior 58 is bounded by a front wall 57 or by an individually shaped extension of the vessel side wall 54, which functions here as the front wall 57. The vessel side wall 54, the rear wall 56 and the front wall 57 are made of metal, in particular steel or aluminum, and/or plastic, in particular fiber-reinforced plastic. A central, essentially circular vessel opening 55 is formed in the front wall 57. The vessel opening 55 is also formed in a channel 55 in a connecting piece 71. The connecting piece 71 and the front wall 57 of the pressure vessel 52 are formed in one piece and are made of metal, in particular steel. A connecting member 62 (FIG. 6) is fixed to the connecting piece 71. A TPRD 60 (temperature pressure relief device) is preferably attached to the connecting member 62, in particular as a pressure relief valve 59. An operating valve 61 is fixed to the TPRD 60 (FIG. 1). The fuel discharged from the interior 58 of the pressure vessel 52 thus flows through the channel 55, the connecting member 62, the TPRD 60 and the service valve 61 in this order. The service valve 61, for example a solenoid valve 61, is opened if hydrogen is required as fuel for normal operation of the fuel cell unit 1 and the service valve 61 is closed when the fuel cell unit 1 is switched off. The service valve 61 thus serves to supply the fuel cell unit 1 with fuel from the pressure vessel 52 or the pressure vessel system 51. Deviating from this, no TPRD 60 can be attached to the connecting member 62, but the service valve 61 can be attached (not shown).

Figure 6:
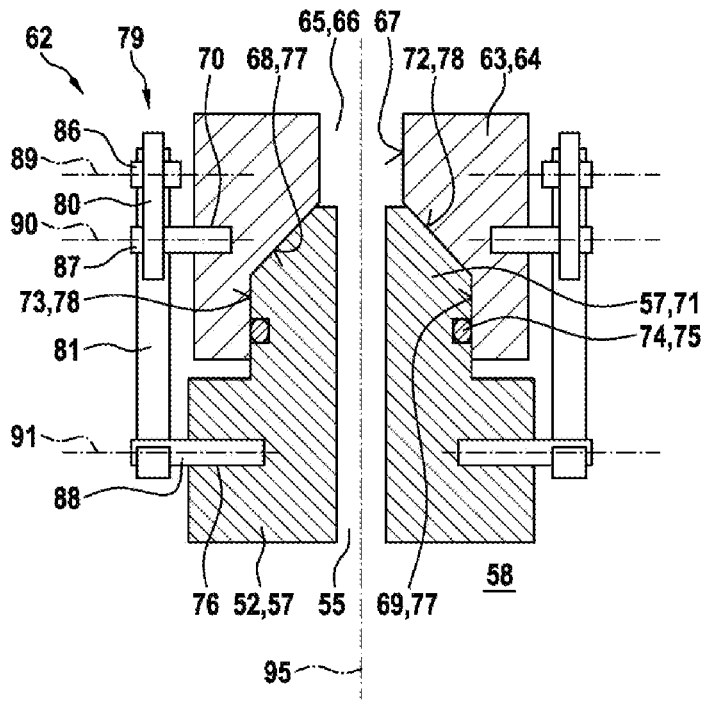

A first conical-jacketed section 72 and a second cylindrical-jacketed section 73 are formed on the connecting piece 71 of the front wall 57 of the pressure vessel 52. The first conical-jacketed section 72 and the second cylindrical-jacketed section 73 form a counter-guide surface 78 of the connecting piece 71. The connecting piece 71 is symmetrical to the centric longitudinal axis 95. An annular groove 74 is also formed on the connecting piece 71 and a gasket 75 in the form of an O-ring gasket 75 or another gasket suitable for high pressure is arranged in the annular groove 74 (FIGS. 3 and 6).

The connecting member 62 essentially comprises a connecting element 63 and a mechanism 79. The connecting element 63 is essentially formed by a connecting ring 64. The connecting ring 64 is essentially tubular with a small axial extension in the direction of the centric longitudinal axis 95. A first cylindrical-jacketed section 67, a second conical-jacketed section 68 and a third cylindrical-jacketed section 69 are formed on a radial inner side of the connecting ring 64 as the connecting element 63. The first cylindrical-jacketed section 67 as an end of the connecting element 63 facing away from the pressure vessel 52 has a smaller diameter than the third cylindrical-jacketed section 69. The second conical-jacketed section 68 thus functions as a conical widening between the first cylindrical-jacketed section 67 and the third cylindrical-jacketed section 69 (FIG. 6). The second conical-jacketed section 68 and the third cylindrical-jacketed section 69 form a guide surface 77 on the connecting element 63. The radially inner side of the connecting element 63, in particular the first cylindrical-jacketed section 67, defines an opening 65 as a channel 66 for the passage of fuel from the interior 58 of the pressure vessel 52. The pressure vessel 52 with the channel 55 as the vessel opening 55 thus functions to conduct the fuel out of the interior 58, which is then passed through the channel 66 of the connecting element 63 as the fuel is conducted out of the pressure vessel 52.

The mechanism 79 comprises a first tensioning lever 80 and a second tensioning lever 81. A total of 2 first tensioning levers 80 and 2 second tensioning levers 81 are arranged on the connecting element 63, wherein only one first tensioning lever 80 and one second tensioning lever 81 are described below for reasons of simplification. An actuating lever 82 is formed as an extension on the second tensioning lever 81. The actuating lever 82 is used so that a force can be applied manually to the second tensioning lever 81. The first tensioning lever 80 and the second tensioning lever 81 are pivotably connected to each other by a connecting joint 83. For this purpose, a connecting bore is formed on the first tensioning lever 80 and a connecting bore is also formed on the second tensioning lever 81 and a connecting bolt 86 is arranged in the connecting bores of the first and second tensioning levers 80, 81. As a result, the first tensioning lever 80 and the second tensioning lever 81 are mounted so that they can pivot relative to each other about a connecting pivot axis 89. The first tensioning lever 80 is pivotably mounted on the connecting element 63 by a first fixing joint 84 about a first fixing pivot axis 90. For this purpose, a retaining bore 70 is formed on the connecting element 63 and a connecting bore is formed in the first tensioning lever 80 and a first fixing bolt 87 is arranged in the connecting bore and in the retaining bore 70. In a similar manner, the second tensioning lever 81 is mounted on the front wall 57, in particular the connecting piece 71, with a second fixing joint 85 so as to be pivotable about a second fixing pivot axis 91. For this purpose, a retaining bore 76 is formed on the front wall 57 and a connecting bore is formed in the second tensioning lever 81 and the second fixing bolt 88 is arranged in the connecting bore and in the retaining bore 71. The connecting pivot axis 89, the first fixing pivot axis 90 and the second fixing pivot axis 91 are essentially parallel. A fictitious dividing plane 92 is aligned parallel to the first fixation pivot axis 90 and the second fixation pivot axis 91 and, in addition, the fixation pivot axes 90, 91 intersect the fictitious dividing plane 92, i.e., the two fixation pivot axes 90, 91 are in the fictitious dividing plane 92. The fictitious dividing plane 92 divides the space in the surroundings of the mechanism 79 into a first half-space 93 and a second half-space 94.

The connecting member 62 can be fixed to the pressure vessel 52 in a simple manner. The connecting element 63 and the mechanism 79 with essentially the first tensioning lever 80 and the second tensioning lever 81 as crank drive 79 are initially designed as separate components. First, the connecting ring 64 is placed on the connecting piece 71 so that the second conical-jacketed section 68 on the radial inside of the connecting element 63 bears against the first conical-jacketed section 72 of the connecting piece 71 and the third cylindrical-jacketed section 69 of the connecting element 63 bears against the second cylindrical-jacketed section 73 of the connecting piece 71 (FIG. 6). As a result, the gasket 75 rests on the third cylindrical-jacketed section 69 and seals the vessel opening 55 with respect to the surroundings, so that the fuel can flow in a fluid-tight manner from the vessel opening 55 into the channel 66 of the connecting element 63. The first fixing bolt 87 of the first tensioning lever 80 is then inserted into the retaining bore 70 of the connecting element 63 and the second fixing bolt 88 of the second tensioning lever 81 is inserted into the retaining bore 76 of the front wall 57.

Figure 4:
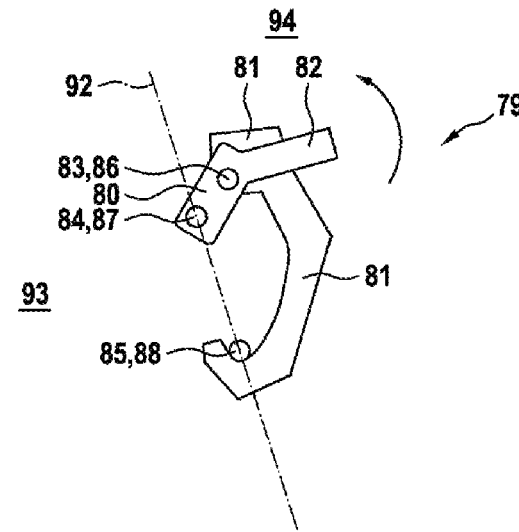
Figure 5:
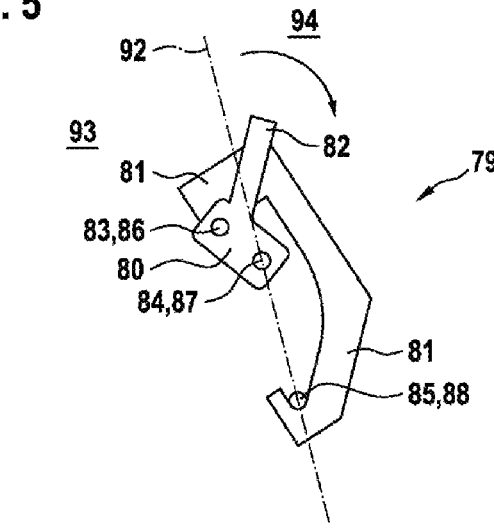

The first tensioning lever 80 and the second tensioning lever 81 are in the lift-off position shown in FIG. 4, so that no compressive force is applied to the connecting element 63 by the first fixing bolt 87, with which the connecting element 63 is pressed onto the counter-guide surface 78 at the guide surface 77. In the lift-off position of the first tensioning lever 80 and the second tensioning lever 81 shown in FIG. 4, the first fixing pivot axis 90 is located in the second half-space 94. To move the first tensioning lever 80 and the second tensioning lever 81 into the fixing position, a force is applied manually with the actuating lever 82 so that the first tensioning lever 80 and the second tensioning lever 81 are pivoted towards each other into the fixing position shown in FIG. 5. In the fixing position shown in FIG. 5, the second tensioning lever 81 is preloaded with a tensile force and, due to the curved design of the second tensioning lever 81, also with a bending moment. These tensile forces acting in the second tensioning lever 81 are applied as compressive forces to the first tensioning lever 80 by means of the connecting bolt 86 and these compressive forces, which act in the first tensioning lever 80, are transmitted to the connecting element 63 by the first fixing bolt 87. As a result, in the fixing position, the connecting element 63 is pressed onto the connecting piece 71 with the compressive force in the direction of the centric longitudinal axis 95 and the second fixing bolt 88 applies an oppositely directed compressive force to the pressure vessel 52.

During the movement of the first tensioning lever 80 and the second tensioning lever 81 from the lift-off position to the fixing position, there is an unstable intermediate position and in the intermediate position the first fixing pivot axis 90 intersects the fictitious dividing plane 92 and the first fixing pivot axis 90 lies completely in the fictitious dividing plane 92. In this unstable intermediate position, the distance between the connecting pivot axis 89 and the second fixing pivot axis 91 is greater than in the fixing position. To pivot the first tensioning lever 80 and the second tensioning lever 81 from the fixing position into the lift-off position, it is therefore necessary to constantly apply a force to the actuating lever 82 during the pivoting of the first tensioning lever 80 and the second tensioning lever 81 from the fixing position into the unstable intermediate position, because during this pivoting the distance between the first fixing pivot axis 90 and the second fixing pivot axis 91 is increased and thus the second tensioning lever 81 is stretched and the first tensioning lever 80 is compressed as an increase in the preload. This ensures that the first tensioning lever 80 and the second tensioning lever 81 do not move unintentionally from the stable fixing position to the lift-off position, because the unstable intermediate position can only be reached actively by manually applying a force to the actuating lever 82 with a correspondingly large amount of force. In the fixing position, the connecting element 63 cannot be moved away from the pressure vessel 52 in the direction of the centric longitudinal axis 95, because the connecting element 63 is pressed onto the pressure vessel 52 with the compressive force in the direction of the centric longitudinal axis 95 and the first and second tensioning levers 80, 81 have a form-fitting clamping and blocking effect due to the fixing position of the first and second tensioning levers 80, 81 relative to one another. To remove the connecting member 62 from the pressure vessel 52, the procedures described above must be carried out in reverse order.

In the pressure vessel system 51, several pressure vessels 52 are connected to one another in a fluid-conducting manner with a rail that is not shown. For the fluid-conducting connection of the rail with the pressure vessels 52, the pressure vessels 52 are each connected to the rail in a fluid-tight manner with the connecting member 62 (not shown).

Overall, the pressure vessel 52 according to the invention, the fuel cell system 4 according to the invention and the motor vehicle 5 according to the invention have significant advantages. The connecting member 62 for fluid-tight connection of the interior 58 of the pressure vessel 52 as the compressed gas reservoir 21 to the compressed gas line 50 can be mounted on and removed from the pressure vessel 52 in a particularly simple manner. The pressure vessel 52 can also be used, for example, in the hydrogen-powered motor vehicle 5, which is driven by the fuel cell system 4 and the electric motor 6 as the drive motor 8. In addition, the pressure vessel 52 can also be used in the motor vehicle 5 with the hydrogen-powered internal combustion engine 7 as the drive engine 8. The actuating lever 82 can also be easily operated with pressure vessels 52 that are difficult to access in confined spaces. This is particularly advantageous in automotive engineering.

The invention claimed is:

1. A pressure vessel (52) for storing a fluid in an interior (58) delimited by the pressure vessel (52), the pressure vessel (52) having a vessel opening (55) for conducting the fluid out of the interior (58) of the pressure vessel (52) and a connecting member (62) fixed in a fluid-tight manner to the pressure vessel (52), the connecting member (62) comprising a connecting element (63) with an opening (65) for conducting the fluid through the vessel opening (55) of the pressure vessel (52) and through the opening (65) of the connecting element (63), a mechanism (79) for form-fittingly and detachably fixing the connecting element (63) to the pressure vessel (52), so that the connecting element (63) bears against the pressure vessel (52) with a compressive force, wherein the mechanism (79) comprises a first tensioning lever (80) and a second tensioning lever (81), which are pivotably connected to one another by a connecting joint (83), so that in a fixing position of the first and second tensioning levers (80, 81) relative to one another, a compressive force is applied to the connecting element (63) by the mechanism (79) and the connecting element (63) bears against the pressure vessel (52) with the compressive force, and wherein the first tensioning lever (80) and the second tensioning lever (81) are pivotable relative to one another about a connecting pivot axis (89) by the connecting joint (83), and wherein the first tensioning lever (80) is pivotable about a first fixing pivot axis (90) relative to the connecting element (63) by a first fixing joint (84), and the second tensioning lever (81) is pivotable about a second fixing pivot axis (91) relative to the pressure vessel (52) by a second fixing joint (85).

2. The pressure vessel according to claim 1, wherein in the fixing position of the first and second tensioning levers (80, 81) relative to one another, the connecting element (63) is form-fittingly fixed between the pressure vessel (52) and the mechanism (79) due to a kinematic clamping effect of the first and second tensioning levers (80, 81).

3. The pressure vessel according to claim 1, wherein in a lift-off position of the first and second tensioning levers (80, 81) relative to one another with the mechanism (79), no compressive force is applied to the connecting element (63) due to pretensioning of the first and second tensioning levers (80, 81).

4. The pressure vessel according to claim 3 wherein in the lift-off position of the first and second tensioning levers (80, 81) relative to one another, a movement of the connecting element (63) away from the pressure vessel (52) is executed without a kinematic clamping effect of the first and second tensioning levers (80, 81) against this movement.

5. The pressure vessel according to claim 1, wherein the first tensioning lever (80) is pivotably connected to the connecting element (63) by a first fixing joint (84).

6. The pressure vessel according to claim 1, wherein the second tensioning lever (81) is pivotably connected to the pressure vessel (52) by a second fixing joint (85).

7. The pressure vessel according to claim 1, wherein the connecting pivot axis (89), the first fixing pivot axis (90) and the second fixing pivot axis (91) are aligned essentially parallel.

8. The pressure vessel according to claim 1, wherein a fictitious dividing plane (92) divides a space at the pressure vessel (52) into a first half-space (93) and a second half-space (94) and the fictitious dividing plane (92) is aligned substantially parallel to the first and second fixing pivot axes (90, 91) and the first and second fixing pivot axes (90, 91) intersect the fictitious dividing plane (92) or the first and second fixing pivot axes (90, 91) lie completely in the fictitious dividing plane (92).

9. The pressure vessel according to claim 8, wherein in the fixing position, the connecting pivot axis (89) is arranged in the first half-space (93).

10. The pressure vessel according to claim 8, wherein in a lift-off position, the connecting pivot axis (89) is arranged in the second half-space (94).

11. The pressure vessel according to claim 1, wherein the compressive force applied to the connecting element (63) by the mechanism (79) is applied by preloading the first tensioning lever (80) with a compressive force and preloading the second tensioning lever (81) with a tensile force.

12. The pressure vessel according to claim 11, wherein the compressive force applied to the connecting element (63) by the mechanism (79) is applied by further preloading the first tensioning lever (80) with a bending moment and by further preloading the second tensioning lever (81) with a bending moment.

13. A fuel cell system (4) comprising a fuel cell unit (1), at least one pressure vessel (52), wherein the at least one pressure vessel (52) is configured according to claim 1.

14. The fuel cell system (4) according to claim 13, wherein the fuel cell system is part of a motor vehicle.

15. A vehicle (5) comprising a drive motor (8) as an electric motor (6) and/or an internal combustion engine (7), at least one pressure vessel (52) filled with a gaseous fuel, wherein the at least one pressure vessel (52) is configured according to claim 1.

* * * * *